United States Patent
Seo et al.

(10) Patent No.: US 10,122,481 B2
(45) Date of Patent: Nov. 6, 2018

(54) METHOD AND APPARATUS FOR REPORTING CHANNEL STATE INFORMATION IN WIRELESS COMMUNICATION SYSTEM

(71) Applicant: LG ELECTRONICS INC., Seoul (KR)

(72) Inventors: Inkwon Seo, Seoul (KR); Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/782,561

(22) PCT Filed: Apr. 16, 2014

(86) PCT No.: PCT/KR2014/003318
§ 371 (c)(1),
(2) Date: Oct. 5, 2015

(87) PCT Pub. No.: WO2014/171742
PCT Pub. Date: Oct. 23, 2014

(65) Prior Publication Data
US 2016/0050648 A1    Feb. 18, 2016

Related U.S. Application Data

(60) Provisional application No. 61/812,688, filed on Apr. 16, 2013, provisional application No. 61/813,163, (Continued)

(51) Int. Cl.
*H04W 72/04* (2009.01)
*H04W 72/00* (2009.01)
(Continued)

(52) U.S. Cl.
CPC ......... *H04B 17/382* (2015.01); *H04B 7/0626* (2013.01); *H04L 5/0091* (2013.01);
(Continued)

(58) Field of Classification Search
CPC ... H04L 5/0057; H04B 7/0619; H04B 7/0626; H04W 72/04
(Continued)

(56) References Cited

U.S. PATENT DOCUMENTS

| 8,868,089 B2 | 10/2014 | Lindbom et al. |
| 2011/0064042 A1* | 3/2011 | Kim ................ H04L 5/0094 370/329 |

(Continued)

FOREIGN PATENT DOCUMENTS

| CN | 101908951 | 12/2010 |
| CN | 101917259 | 12/2010 |

(Continued)

OTHER PUBLICATIONS

Qualcomm Incorporated, "CSI processing relaxations for DL CoMP," 3GPP TSG-RAN WG1 #70bis, R1-124442, Oct. 2012, 7 pages.

(Continued)

*Primary Examiner* — Asad Nawaz
*Assistant Examiner* — Jason Harley
(74) *Attorney, Agent, or Firm* — Lee Hong Degerman Kang Waimey

(57) ABSTRACT

One embodiment of the present invention provides a method for reporting channel state information (CSI) of a terminal in a wireless communication system, comprising the steps of: receiving a downlink signal comprising an uplink grant; when a CSI request field contained in the downlink signal triggers a CSI report, deriving a CQI value on the basis of a PDSCH transmission block in a CSI reference resource; and carrying out a CSI report including the CQI value in
(Continued)

subframe n, wherein the CSI reference resource is the last subframe that is not later than a subframe which is four subframes before subframe n.

12 Claims, 9 Drawing Sheets

Related U.S. Application Data filed on Apr. 17, 2013, provisional application No. 61/815,253, filed on Apr. 23, 2013, provisional application No. 61/868,054, filed on Aug. 20, 2013, provisional application No. 61/875,672, filed on Sep. 9, 2013, provisional application No. 61/914,948, filed on Dec. 11, 2013, provisional application No. 61/925,640, filed on Jan. 9, 2014.

(51) Int. Cl.
| | |
|---|---|
| *H04L 5/00* | (2006.01) |
| *H04B 17/382* | (2015.01) |
| *H04B 7/06* | (2006.01) |
| *H04W 72/08* | (2009.01) |
| *H04W 72/14* | (2009.01) |
| *H04W 24/10* | (2009.01) |
| *H04L 5/14* | (2006.01) |

(52) U.S. Cl.
CPC ......... *H04W 24/10* (2013.01); *H04W 72/042* (2013.01); *H04W 72/0406* (2013.01); *H04W 72/0493* (2013.01); *H04W 72/082* (2013.01); *H04W 72/14* (2013.01); *H04L 5/0057* (2013.01); *H04L 5/0073* (2013.01); *H04L 5/1469* (2013.01)

(58) Field of Classification Search
USPC .................................................. 370/252, 329
See application file for complete search history.

(56) References Cited

U.S. PATENT DOCUMENTS

| | | |
|---|---|---|
| 2011/0249578 A1 | 10/2011 | Nayeb Nazar et al. |
| 2011/0305161 A1 | 12/2011 | Ekpenyong et al. |
| 2012/0076017 A1 | 3/2012 | Luo et al. |
| 2013/0121174 A1 | 5/2013 | Koivisto |
| 2013/0194931 A1* | 8/2013 | Lee ................... H04L 5/0053 370/241 |
| 2013/0322376 A1 | 12/2013 | Marinier et al. |
| 2014/0036664 A1 | 2/2014 | Han et al. |
| 2015/0358139 A1 | 12/2015 | Li et al. |

FOREIGN PATENT DOCUMENTS

| | | |
|---|---|---|
| CN | 102271032 | 12/2011 |
| CN | 102325013 | 1/2012 |
| CN | 102368697 | 3/2012 |
| CN | 102624490 | 8/2012 |
| CN | 102763476 | 10/2012 |
| CN | 102812658 | 12/2012 |
| CN | 102893546 | 1/2013 |
| JP | 2012-175272 | 9/2012 |
| KR | 10-2013-0018052 | 2/2013 |
| KR | 10-2013-0018850 | 2/2013 |

OTHER PUBLICATIONS

Intel Corporation, "Signaling details of PDSCH RE mapping and aperiodic CSI triggering," 3GPP TSG-RAN WG1 #70bis, R1-124118, Oct. 2012, 7 pages.

PCT International Application No. PCT/KR2014/003318, Written Opinion of the International Searching Authority dated Aug. 7, 2014, 21 pages.

Intel Corporation, "Correction to RI-reference CSI process and CSI process configurations with subframe sets," 3GPP TSG-RAN WG1 #72, R1-130069, Feb. 2013, 11 pages.

Samsung, "Draft CR on subframe set configuration for CSI reporting" 3GPP TSG-RAN WG1 #72, R1-130278, Feb. 2013, 4 pages.

ZTE, "Correction to Aperiodic CSI reporting with one configured CSI process," 3GPP TSG-RAN WG1 #72, R1-130628, Feb. 2013, 4 pages.

3rd Generation Partnership Project (3GPP), "Technical Specification Group Radio Access Network; Evolved Universal Terrestrial Radio Access (E-UTRA); Physical layer procedures (Release 11)," 3GPP TS 36.213 V11.2.0, Feb. 2013, 174 pages.

PCT International Application No. PCT/KR2014/003315, Written Opinion of the International Searching Authority dated Jul. 17, 2014, 22 pages.

U.S. Appl. No. 14/782,561, Office Action dated Jun. 20, 2017, 15 pages.

The State Intellectual Property Office of the People's Republic of China Application Serial No. 201480021531.7, Office Action dated Oct. 9, 2017, 9 pages.

The State Intellectual Property Office of the People's Republic of China Application Serial No. 201480021828.3, Office Action dated Oct. 9, 2017, 9 pages.

CATT, "Considerations on Remaining Issues of CSI Feedback", R1-110057, 3GPP TSG RAN WG1 meeting #63bis, Jan. 2011, 5 pages.

Huawei, HiSilicon, "CSI feedback modes for CoMP", R1-121946, 3GPP TSG RAN WG1 Meeting #69, May 2012, 3 pages.

U.S. Appl. No. 14/779,307, Final Office Action dated Dec. 28, 2017, 20 pages.

State Intellectual Property Office of the People's Republic of China Application Serial No. 201480021531.7, Office Action dated Jun. 1, 2018, 18 pages.

* cited by examiner

FIG. 5
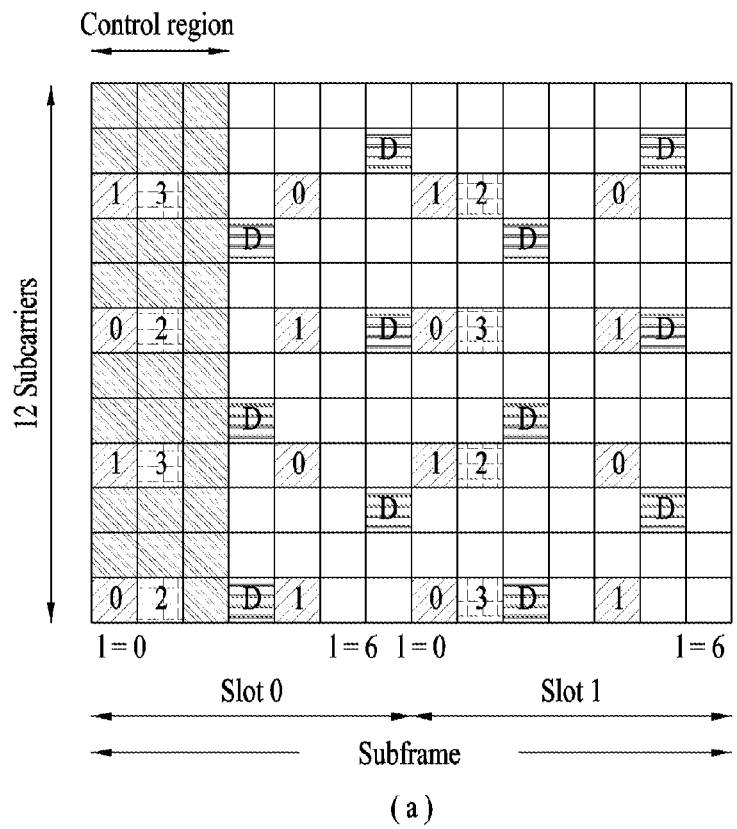
(a)
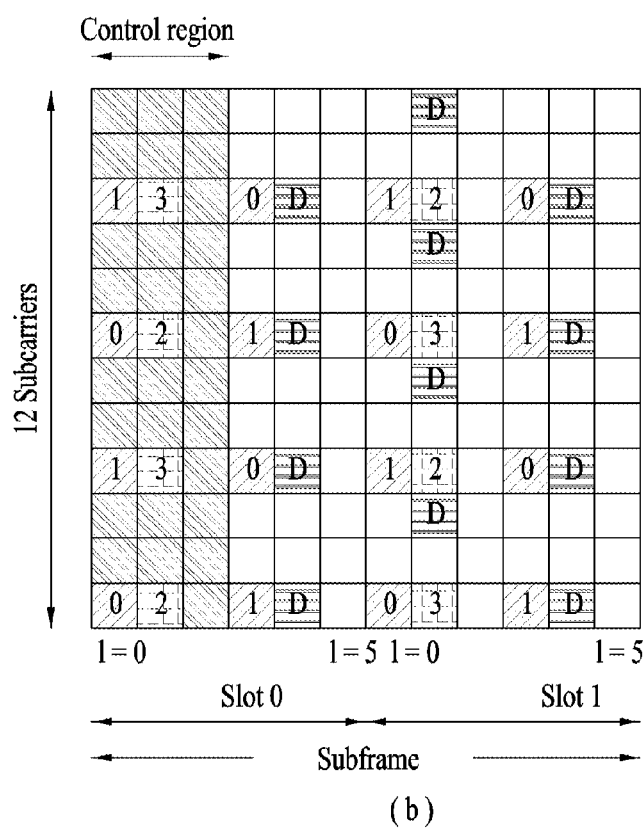
(b)

FIG. 6

METHOD AND APPARATUS FOR REPORTING CHANNEL STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2014/003318, filed on Apr. 16, 2014, which claims the benefit of U.S. Provisional Application No. 61/812,688, filed on Apr. 16, 2013, 61/813,163, filed on Apr. 17, 2013, 61/815,253, filed on Apr. 23, 2013, 61/868,054, filed on Aug. 20, 2013, 61/875,672, filed on Sep. 9, 2013, 61/914,948, filed on Dec. 11, 2013 and 61/925,640, filed on Jan. 9, 2014, the contents of which are all hereby incorporated by reference herein in their entirety.

TECHNICAL FIELD

The present invention relates to a wireless communication system and, more particularly, to a method and apparatus for reporting channel state information.

BACKGROUND ART

Wireless communication systems have been widely deployed in order to provide various types of communication services such as voice or data services. Generally, a wireless communication system is a multiple access system capable of supporting communication with multiple users by sharing available system resources (bandwidth, transmit power, etc.). Multiple access systems include, for example, a Code Division Multiple Access (CDMA) system, a Frequency Division Multiple Access (FDMA) system, a Time Division Multiple Access (TDMA) system, an orthogonal frequency division multiple access (OFDMA) system, a Single-Carrier Frequency Division Multiple Access (SC-FDMA) system, and a Multi-Carrier Frequency Division Multiple Access (MC-FDMA) system.

DETAILED DESCRIPTION OF THE INVENTION

Technical Problems

An object of the present invention is to provide a method for reporting channel state information in a system using subframes through usage change in Time Division Duplex (TDD).

The technical objects that can be achieved through the present invention are not limited to what has been particularly described hereinabove and other technical objects not described herein will be more clearly understood by persons skilled in the art from the following detailed description.

Technical Solutions

In a first technical aspect of the present invention, provided herein is a method for receiving a downlink signal including an uplink grant; deriving a Channel Quality Indicator (CQI) value based on a Physical Downlink Shared Channel (PDSCH) transport block in a CSI reference resource when a CSI request field included in the downlink signal triggers CSI reporting; and performing CSI reporting including the CQI value in a subframe n, wherein the CSI reference resource is a last subframe not later than a subframe which precedes the subframe n by 4 subframes.

In a second aspect of the present invention, provided herein is a In another aspect of the present invention, provided herein is a User Equipment (UE) comprising, a reception module; and a processor, wherein the processor is configured to receive a downlink signal including an uplink grant, derive a Channel Quality Indicator (CQI) value based on a Physical Downlink Shared Channel (PDSCH) transport block in a CSI reference resource when a CSI request field included in the downlink signal triggers CSI reporting, and perform CSI reporting including the CQI value in a subframe n, and wherein the CSI reference resource is a last subframe not later than a subframe which precedes the subframe n by 4 subframes.

The technical aspects include one or more following features.

If two or more subframe sets are configured for the UE, a subframe set related to CSI reporting is indicated by information included in the downlink signal.

The last subframe is included in the subframe set related to CSI reporting.

At least one CSI process is configured for the UE.

The CSI process includes a CSI-Reference Signal (CSI-RS) resource for signal measurement and two CSI-Interference Measurement (IM) resources for interference measurement.

The CSI reference resource corresponds to a subframe set indicated by the CSI request field.

The UE has capabilities of receiving a downlink signal in a subframe different from a subframe used in an uplink-downlink configuration indicated by system information.

The information included in the downlink signal is the CSI request field.

A relationship between a value of the CSI request field and the two or more subframe sets is indicated by a Radio Resource Control (RRC) signaling.

A transmission mode configured for the UE is one of transmission modes 1 to 10.

The downlink signal is Downlink Control Information (DCI) including the uplink grant.

CSI reporting is transmitted over a Physical Uplink Shared Channel (PUSCH).

Advantageous Effects

According to the present invention, accurate channel state information can be reported by reflecting interference characteristics through usage change of subframes in TDD.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

FIG. 5 is a diagram for explaining a reference signal.

FIG. 6 is a diagram for explaining a channel state information reference signal.

BEST MODE FOR CARRYING OUT THE INVENTION

Figure 1:
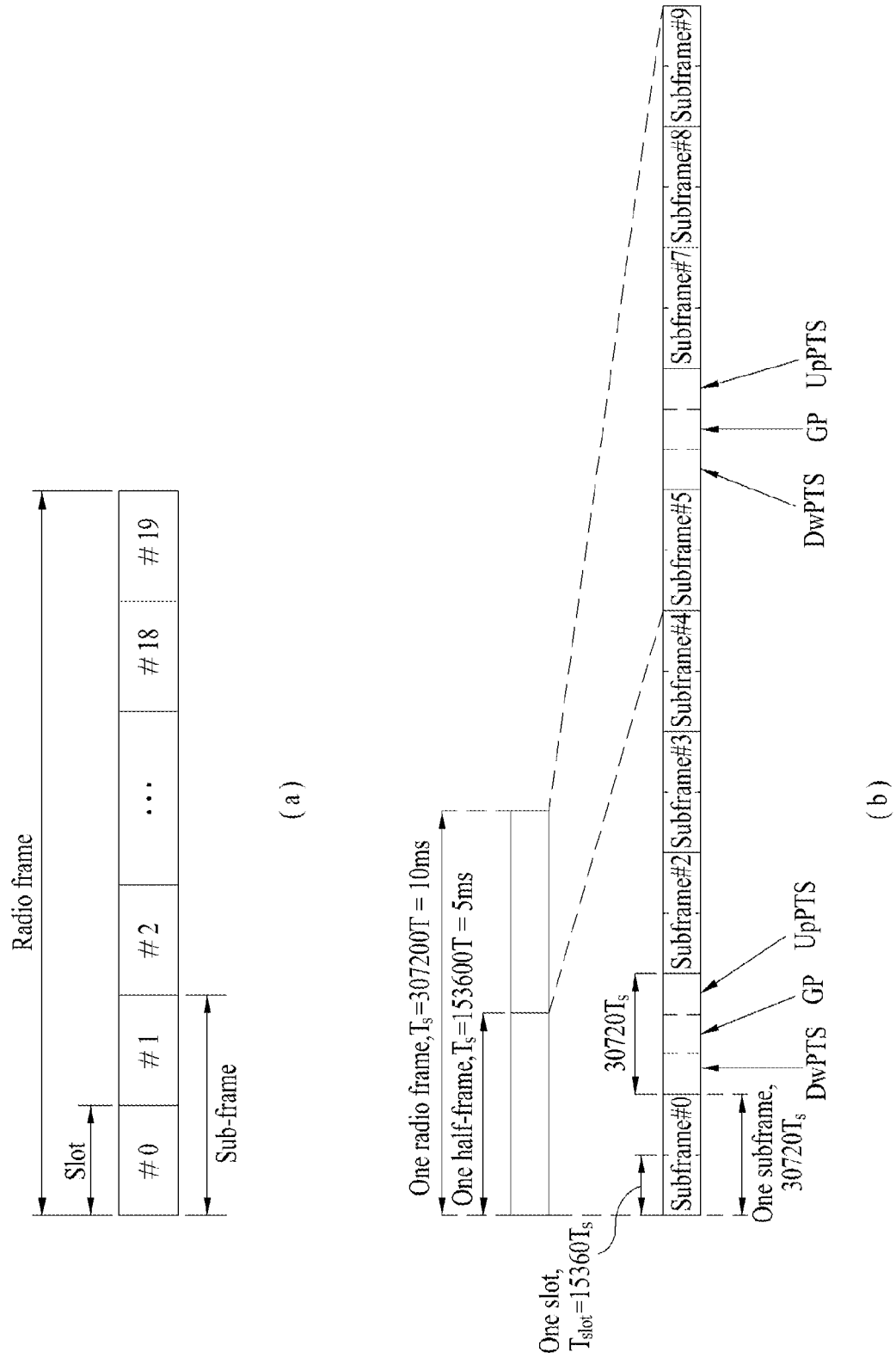
FIG. 1 is a diagram illustrating the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE—A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
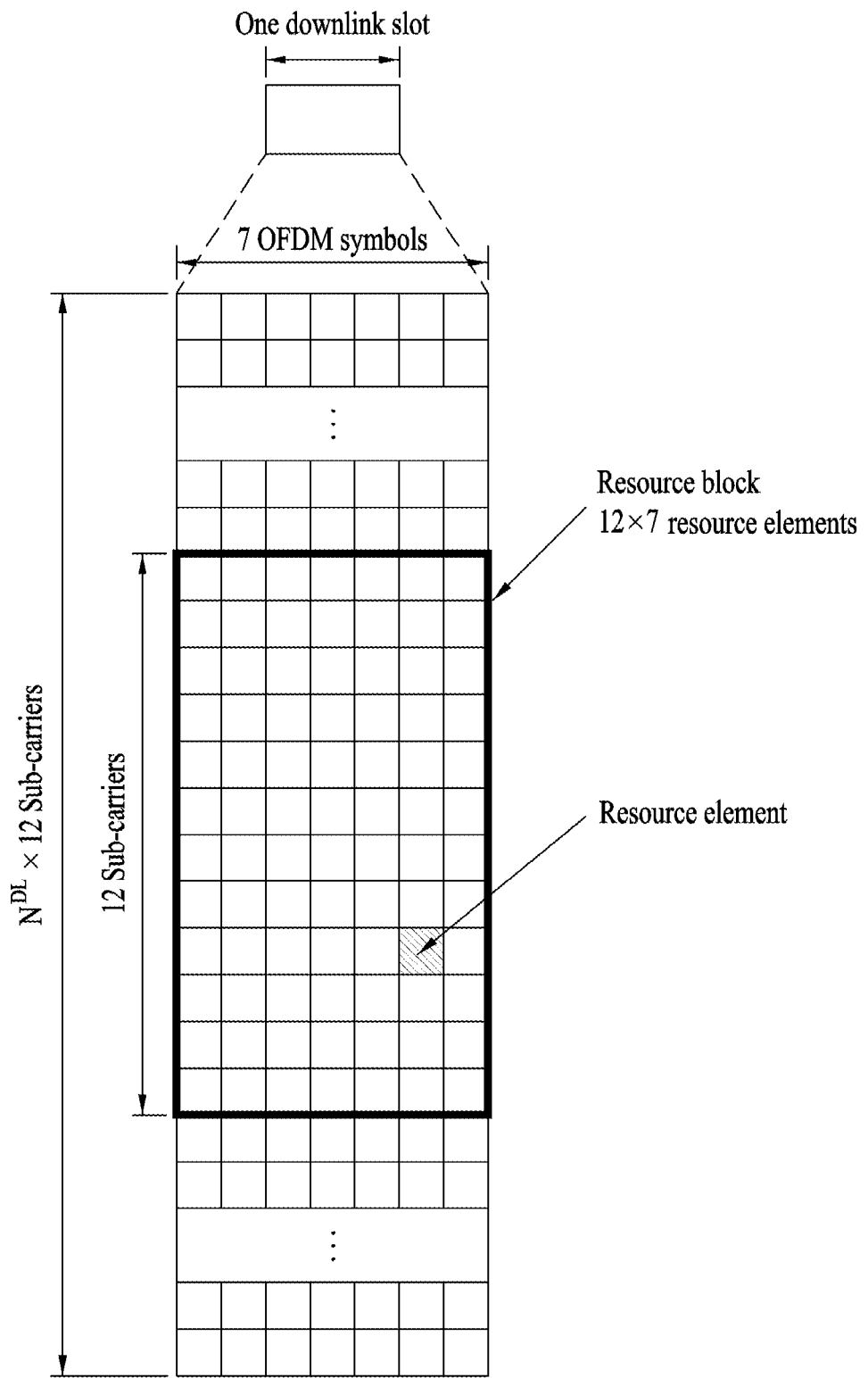
FIG. 2 is a diagram illustrating a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
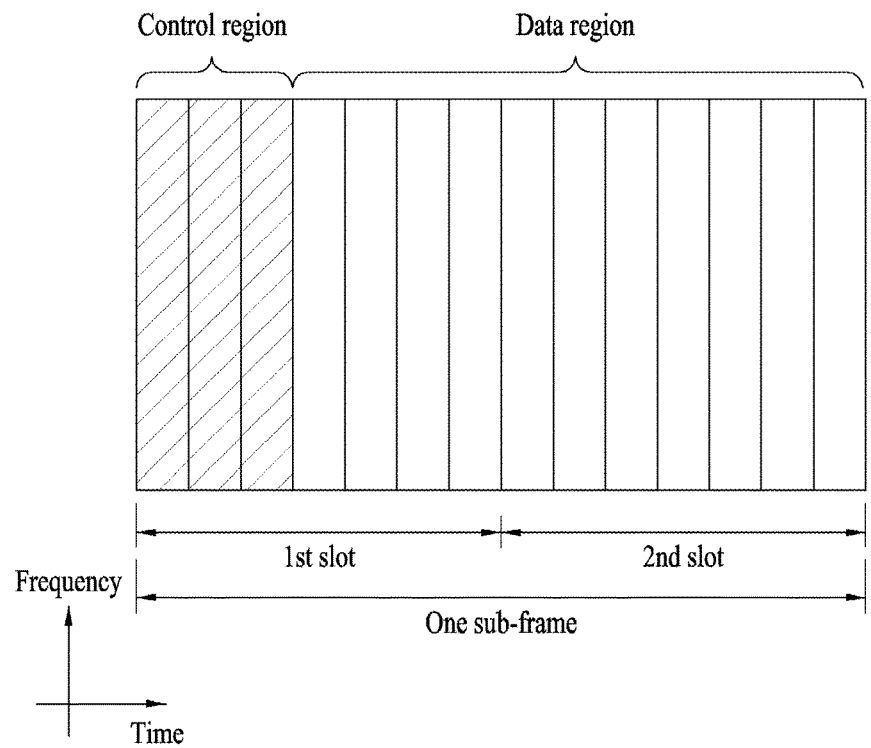
FIG. 3 is a diagram illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
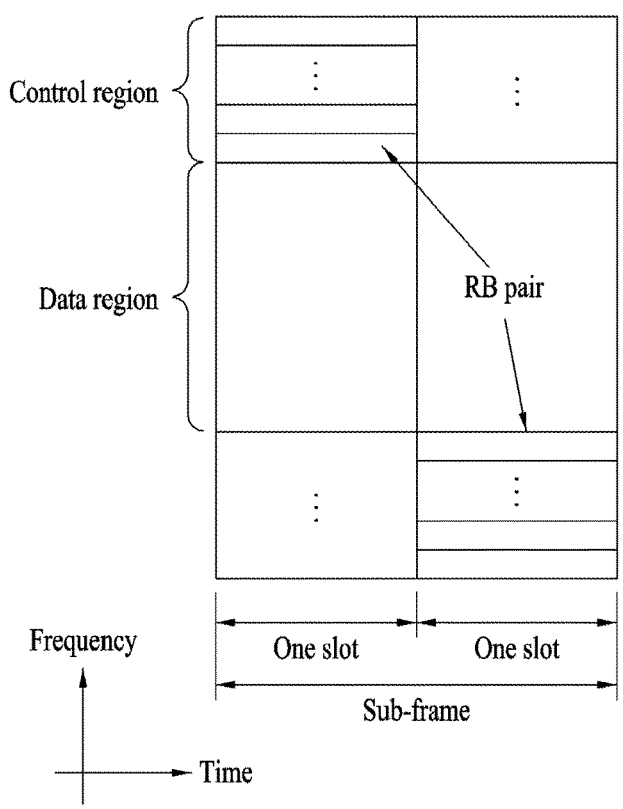
FIG. 4 is a diagram illustrating the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:
  i) DeModulation-Reference Signal (DM-RS) used for channel estimation for coherent demodulation of information delivered on a PUSCH and a PUCCH; and
  ii) Sounding Reference Signal (SRS) used for an eNB or a network to measure the quality of an uplink channel in a different frequency.

The downlink RSs are categorized into:
  i) Cell-specific Reference Signal (CRS) shared among all UEs of a cell;
  ii) UE-specific RS dedicated to a specific UE;
  iii) DM-RS used for coherent demodulation of a PDSCH, when the PDSCH is transmitted;
  iv) Channel State Information-Reference Signal (CSI-RS) carrying CSI, when downlink DM-RSs are transmitted;
  v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

FIG. 5 illustrates patterns in which CRSs and DRSs are mapped to a downlink RB pair, as defined in a legacy 3GPP LTE system (e.g. conforming to Release-8). An RS mapping unit, i.e. a downlink RB pair may include one subframe in time by 12 subcarriers in frequency. That is, an RB pair includes 14 OFDM symbols in time in the case of the normal CP (see FIGS. 5(a)) and 12 OFDM symbols in time in the case of the extended CP (see FIG. 5(b)).

In FIG. 5, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'ID' denotes the positions of DRSs.

Channel State Information-RS (CSI-RS)

CSI-RS is an RS used for channel measurement in an LTE-A system supporting up to eight antenna ports on downlink. CSI-RS differs in this aspect from CRS used for both channel measurement and data demodulation and thus it is not necessary to transmit CSI-RSs in every subframe like CRSs. CSI-RS is used in Transmission Mode 9. For data demodulation, DM-RS is used.

More specifically, CSI-RSs may be transmitted through 1, 2, 4 or 8 antenna ports. Antenna port 15 may be used for one antenna port, antenna ports 15 and 16 for two antenna ports, antenna ports 15 to 18 for four antenna ports, and antenna ports 15 to 22 for eight antenna ports.

CSI-RSs may be generated by the following [Equation 1].

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 1]

$$m = 0, 1, \ldots, N_{RB}^{max,DL} - 1$$

where $r_{l,n_s}(m)$ denotes the generated CSI-RSs, $c(i)$ denotes a pseudo-random sequence, $n_s$ is a slot number, 1 is an OFDM symbol index, and $N_{RB}^{max,DL}$ denotes the maximum number of RBs in a downlink bandwidth. [73] The CSI-RSs generated by [Equation 1] may be mapped to REs on a per-antenna port basis by the following equation.

$$a_{k,l}^{(p)} = w_{l''} \cdot r_{l,n_s}(m')$$ [Equation 2]

$$k = k' + 12m + \begin{cases} -0 & \text{for } p \in \{15, 16\}, \text{normal cyclic prefix} \\ -6 & \text{for } p \in \{17, 18\}, \text{normal cyclic prefix} \\ -1 & \text{for } p \in \{19, 20\}, \text{normal cyclic prefix} \\ -7 & \text{for } p \in \{21, 22\}, \text{normal cyclic prefix} \\ -0 & \text{for } p \in \{15, 16\}, \text{extended cyclic prefix} \\ -3 & \text{for } p \in \{17, 18\}, \text{extended cyclic prefix} \\ -6 & \text{for } p \in \{19, 20\}, \text{extended cyclic prefix} \\ -9 & \text{for } p \in \{21, 22\}, \text{extended cyclic prefix} \end{cases}$$

$$l = l' + \begin{cases} l'' & \text{CSI reference signal configuartions 0 - 19,} \\ & \text{normal cyclic prefix} \\ 2l'' & \text{CSI reference signal configuartions 20 - 31,} \\ & \text{normal cyclic prefix} \\ l'' & \text{CSI reference signal configuartions 0 - 27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In [Equation 2], k' and l' may be determined according to CSI-RS configurations as illustrated in [Table 1].

TABLE 1

| | CSI RS Con-figu-ration | Number of CSI RSs configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |

TABLE 1-continued

| CSI RS Con- figuration | Number of CSI RSs configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 29 | (2, 1) | 1 | | | | |
| 30 | (1, 1) | 1 | | | | |
| 31 | (0, 1) | 1 | | | | |

Figure 6:
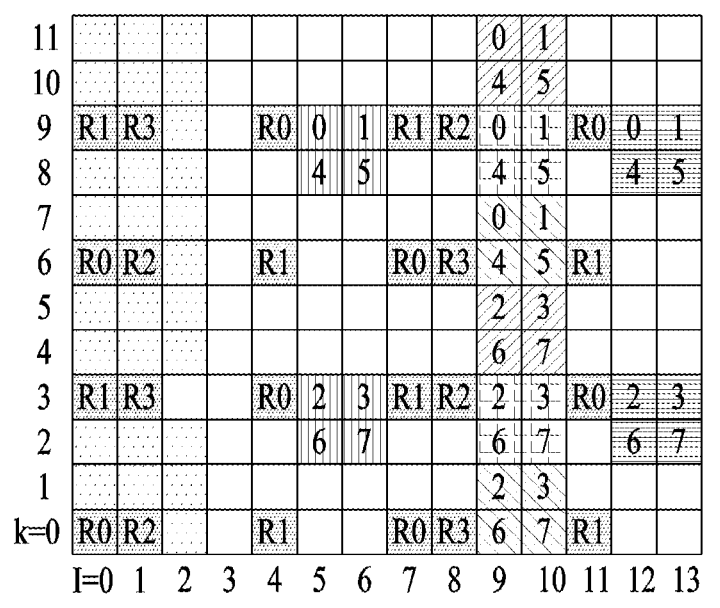

By Equation 2 and Table 1, a specific CSI-RS is mapped to an RE according to each antenna port. In FIG. 6, a CSI-RS is mapped with respect to each antenna port according to the above description. In FIG. 6, R0 to R3 represent mapping of CRSs for respective antenna ports and numbers denote mapping of CSI-RSs for respective antenna ports. For example, an RE denoted by number 0 or 1 indicates that a CSI-RS corresponding to antenna port 0 or 1 is mapped. In this case, CSI-RSs corresponding to two antenna ports are mapped to the same RE and this may be distinguished by different orthogonal codes. (이 문단은 번역이 국문 과 다르게 되어 있어서 수정을 한 것이니 검토 부탁드립니다)

As described above, the CSI-RSs may not be transmitted in every subframe but may be transmitted in a specific subframe. More specifically, the CSI-RSs may be transmitted in a subframe satisfying Equation 3 below by referring to a CSI-RS subframe configuration shown in Table 2.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}-5$ |
| 15-34 | 20 | $I_{CSI-RS}-15$ |
| 35-74 | 40 | $I_{CSI-RS}-35$ |
| 75-154 | 80 | $I_{CSI-RS}-75$ |

$$(10n_f + \lfloor n_s/2 \rfloor - \Delta_{CSI-RS}) \mod T_{CSI-RS} = 0 \quad (3)$$

where $T_{CSI-RS}$ denotes the transmission period of CSI-RSs, $\Delta_{CSI-RS}$ is an offset, $n_f$ is a system frame number, and $n_s$ is a slot number.

These CSI-RSs may be signaled to a UE in a CSI-RS configuration Information Element (IE) (CSI-RS-Config-r10) described in [Table 3] below.

TABLE 3

```
CSI-RS-Config-r10 ::=        SEQUENCE {
    csi-RS-r10                   CHOICE {
        release                      NULL,
        setup                        SEQUENCE {
            antennaPortsCount-r10        ENUMERATED
{an1, an2, an4, an8},
            resourceConfig-r10           INTEGER
                                         (0..31),
            subframeConfig-r10           INTEGER (0..154),
            p-C-r10
INTEGER (-8..15)
        }
    }
}
```

TABLE 3-continued

```
                                         OPTIONAL,      -- Need ON
    zeroTxPowerCSI-RS-r10        CHOICE {
        release                      NULL,
        setup                        SEQUENCE {
            zeroTxPowerResourceConfigList-r10    BIT STRING
(SIZE (16)),
            zeroTxPowerSubframeConfig-r10   INTEGER (0..154)
        }
    }
                                         OPTIONAL      -- Need ON
}
```

In [Table 3], 'antennaPortsCount-r10' indicates the number of antennas through which CSI-RSs are transmitted (one of 1, 2, 4 and 8 is selected), and 'resourceConfig-r10' specifies REs carrying the CSI-RSs in one RB in the time-frequency domain. 'subframeConfig-r10' indicates a subframe carrying the CSI-RSs and the ratio of a CSI-RS Energy Per Resource Element (EPRE) to a PDSCH EPRE. In addition, the eNB transmits information about zero-power CSI-RSs.

In the CSI-RS Config IE, 'resourceConfig-r10' indicates the positions of the CSI-RSs. Specifically, 'resourceConfig-r10' indicates the positions of symbols and subcarriers carrying the CSI-RSs in one RB according to a CSI-RS configuration number ranging from 0 to 31 in [Table 1].

Channel State Information (CSI) Feedback

MIMO can be categorized into an open-loop scheme and a closed-loop scheme. The open-loop scheme performs MIMO transmission at a transmitter without feedback of CSI from a MIMO receiver, whereas the closed-loop scheme performs MIMO transmission at the transmitter using feedback of CSI from the MIMO receiver. In closed-loop MIMO, each of the transmitter and the receiver may perform beamforming based on CSI to obtain multiplexing gain of MIMO transmit antennas. The transmitter (e.g., eNB) may allocate an uplink control channel or an uplink shared channel to the receiver (e.g., UE) such that the receiver may feed back CSI.

CSI fed back may include a Rank Indicator (RI), a Precoding Matrix Index (PMI), and a Channel Quality Indictor (CQI).

The RI indicates information about a channel rank. The channel rank represents a maximum number of layers (or streams) through which different pieces of information may be transmitted through the same time-frequency resource. The RI is mainly determined by long term fading of a channel and, thus, the RI may be fed back at a longer period relative to the PMI and CQI.

The PMI is information about a precoding matrix used for transmission from the transmitter and is a value in which spatial characteristics of a channel are reflected. Precoding refers to mapping a transport layer to a transmit antenna. A layer-to-antenna mapping relation may be determined by a precoding matrix. The PMI indicates a precoding matrix index of an eNB preferred by a UE based on a metric such as Signal-to-Interference plus Noise Ratio (SINR). To reduce feedback overhead of precoding information, the transmitter and receiver may share a codebook including various precoding matrices and only an index indicating a specific precoding matrix in the codebook may be fed back.

In a system supporting an extended antenna configuration (e.g., LTE-A system), acquisition of additional multi-user diversity using Multi-User MIMO (MU-MIMO) is considered. When an eNB performs downlink transmission using CSI fed back by one of multiple UEs, it is necessary to prevent downlink transmission from interfering with other UEs since an interference channel is present between UEs multiplexed in the antenna domain in MU-MIMO. Accordingly, in order to correctly perform MU-MIMO operation, more accurate CSI feedback than Single User MIMO (SU-MIMO) needs to be fed back.

A new CSI feedback scheme that improves CSI composed of the RI, PMI, and CQI may be applied in order to measure and report more accurate CSI. For example, precoding information fed back by the receiver may be indicated by a combination of two PMIs. One (first PMI) of the two PMIs has long term and/or wideband attributes and may be referred to as W1. The other PMI (second PMI) of the two PMIs has short term and/or subband attributes and may be referred to as W2. A final PMI may be determined by a combination (or function) of W1 and W2. For example, if the final PMI is W, W may be defined as W=W1*W2 or W=W2*W1.

The CQI is information indicating channel quality or channel strength. The CQI may be represented by an index corresponding to a combination of predetermined MCSs. That is, a feedback CQI index may indicate a modulation scheme and a code rate. Generally, the CQI is a value reflecting a reception SNR capable of being obtained when the eNB configures a spatial channel using the PMI.

The CSI feedback scheme is divided into periodic reporting through a PUCCH, which is an uplink control channel, and aperiodic reporting through a PUSCH, which is an uplink data channel, performed at the request of an eNB.

CSI Reference Resource

The current LTE/LTE-A system defines a CSI reference resource related to channel measurement for the above-described CSI feedback/reporting. In the frequency domain, the CSI reference resource is defined as a group of physical RBs corresponding to a frequency band with which a calculated CQI is associated. In the time domain, the CSI reference resource is defined as $n-n_{CQI\_ref}$ where n is a subframe in which the CSI is to be transmitted/reported. $n-n_{CQI\_ref}$ is i) the smallest value among values greater than or equal to 4, which is a valid downlink subframe for periodic CSI reporting, ii) a valid subframe corresponding to a subframe in which a CSI request in a DCI format is transmitted for aperiodic CSI reporting, or iii) 4 in the case of a CSI request in a random access response grant for aperiodic CSI reporting. A subframe is considered valid when it is configured as a downlink subframe for a particular UE, it is not a multicast broadcast single frequency network (MBSFN) subframe except for transmission mode 9, it contains a DwPTS with a predetermined size or more in TDD, it is not included in a measurement gap configured for the UE, and it should be an element of a CSI subframe set when that UE is configured with CSI subframe sets for periodic CSI reporting. CSI subframe sets ($C_{CSI,0}$, $C_{CSI,1}$) may be configured for the UE by a higher layer. The CSI reference resource may be included in any one of two subframes sets ($C_{CSI,0}$, $C_{CSI,1}$) (hereinafter, $C_{CSI,0}$ is referred to as C0 and $C_{CSI,1}$ is referred to as C1, for convenience) but may not be included in both sets.

Enhanced Interference Management and Traffic Adaptation (eIMTA)

In the case of TDD, subframes (except for a special subframe for switching between uplink and downlink) may be preconfigured to be used for either uplink or downlink. Specifically, referring to Table 4 below, for example, in the case of uplink-downlink configuration 0, subframe numbers 0 and 5 are preconfigured to be used for downlink and subframe numbers 2, 3, 4, 7, 8, and 9 are preconfigured to be used for uplink in one radio frame. An uplink-downlink configuration to be used by a specific eNB may be provided to a UE as a part of system information (e.g., SIB 1). In this case, neighboring eNBs may be forced to use the same TDD configuration, i.e., the same uplink-downlink configuration as that used by the specific eNB, for reasons of interference etc.

TABLE 4

| Uplink-downlink Config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

(D: subframe for downlink transmission, U: subframe for uplink transmission, S: special subframe)

If the amount of data transmitted on uplink or downlink in each cell remarkably increases even when a system is operated according to uplink-downlink configurations as shown in Table 1, one or more subframes configured for uplink may be changed to subframes for downlink or one or more subframes configured for downlink may be changed/switched to subframes for uplink for smooth transmission of data, thereby raising efficiency.

Switching from an uplink subframe to a downlink subframe may be performed in subframes shaded in Table 5 below. Table 6 shows the case in which a switching period is permitted to be changed and subframes that can be used through switching to downlink subframes when the switching period is not allowed to be changed are shaded.

TABLE 5

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 6

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Switching from uplink subframes to downlink subframes may be performed when an existing TDD configuration is satisfied. In other words, if subframe usage is dynamically switched, a TDD uplink-downlink configuration after switching should be any one of the uplink-downlink configurations of Table 4. For example, if subframe number 4 in uplink-downlink configuration 0 is switched to a downlink subframe, subframe number 9 should also be switched to a downlink subframe. This has an advantage of indicating whether an uplink-downlink configuration is switched through one bit.

Figure 7:
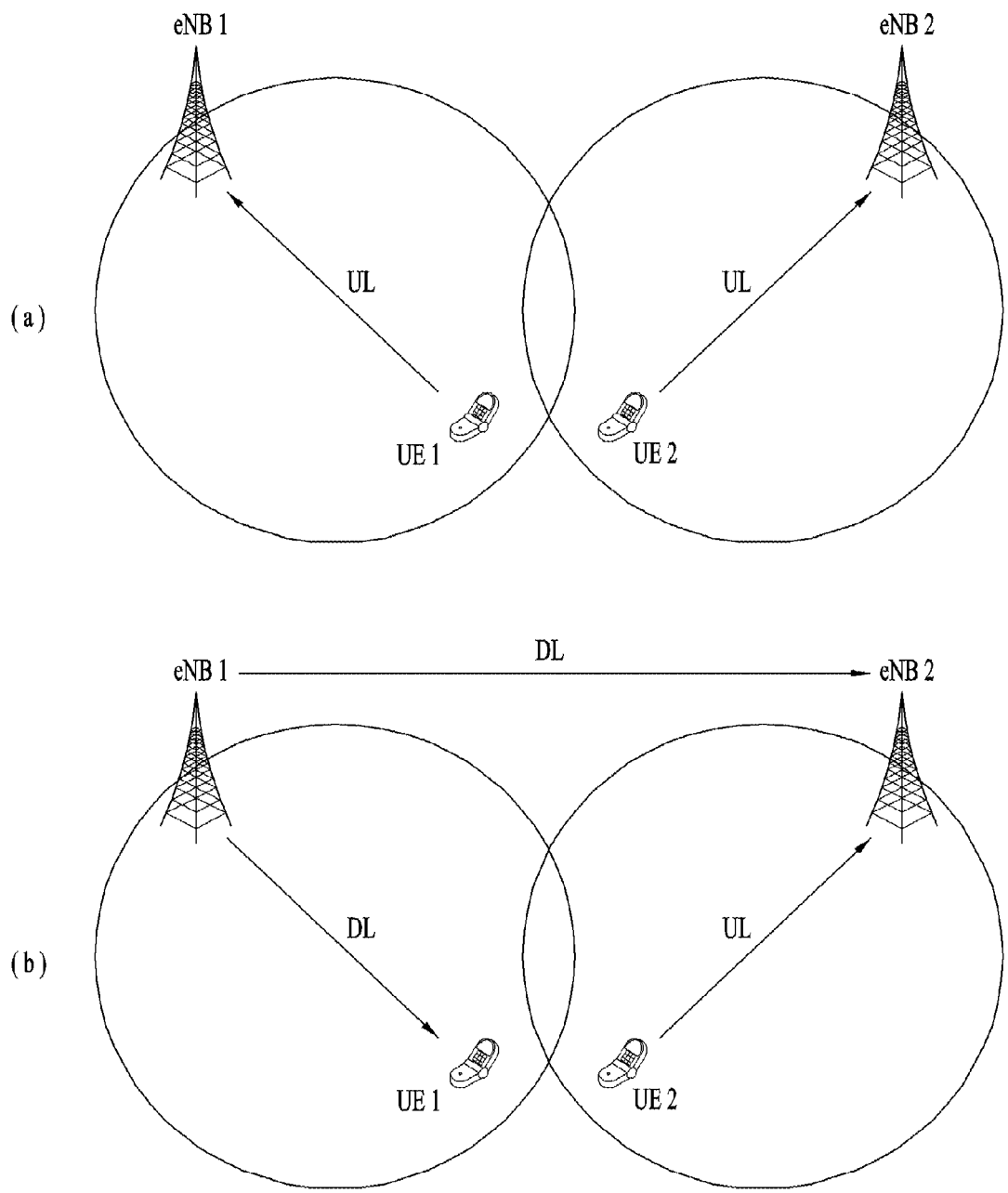
FIG. 7 is a diagram for explaining a system to which an embodiment of the present invention is applicable.

In eIMTA described above, when CSI triggering and/or reporting in a legacy LTE system is performed without change, accuracy of CSI reporting may be lowered. More specifically, in eIMTA, subframes may be divided into two types/sorts: flexible subframes (subframes in which a duplex direction can be changed or subframes in which a changed duplex direction is used (for a predetermined time, e.g., for a switching period of an uplink-downlink configuration of SIB 1) as an eNB is needed) and static subframes. A static subframe and a flexible subframe may have different interference characteristics or different power characteristics. For example, referring to FIG. 7, FIG. 7(a) illustrates an example of a static subframe in which UEs transmit uplink signals to eNBs according to the same uplink-downlink configuration of a first eNB eNB1 and a second eNB eNB2 and FIG. 7(b) illustrates an example of a flexible subframe in which the first eNB uses an uplink subframe as a downlink subframe through usage change. In the flexible subframe as illustrated in FIG. 7(b), an uplink signal transmitted by a second UE UE2 may function as large interference with respect to a first UE UE1. In addition, transmit power may be changed in the flexible subframe. For example, in FIG. 7(b), a downlink signal transmitted by the first eNB may serve as interference with respect to the second eNB and, in order to reduce this influence, the second eNB may cause the second UE to transmit the signal at higher transmit power than transmit power in the static subframe. In this way, since interference/power characteristics may be different in the static subframe and the flexible subframe, reporting performed by averaging signals/interference levels measured in subframes in which interference/power characteristics are different may be inaccurate. To solve this problem, two or more subframe sets (that may include a static subframe set and a flexible subframe set) may be configured for the UE so as to perform CSI reporting.

However, in this case, triggering of CSI reporting and determination of CSI reference resource may be problematic. Aperiodic CSI reporting may be performed by a UE when a CSI request field included in a downlink signal including an uplink grant (e.g., DCI formats 0 and 4 including the uplink grant or a random access response including the uplink grant) triggers CSI reporting. If CSI reporting is performed with respect to a subframe set including a subframe for which CSI reporting is triggered, CSI reporting may not be performed with respect to a specific subframe set. (For example, the UE may not perform CSI reporting for a flexible subframe set because an uplink grant is not transmitted in the flexible subframe in eIMTA.) Therefore, a triggering method of CSI reporting when two or more subframe sets are configured for the UE and configuration of a CSI reference resource according to the proposed CSI reporting triggering method will be described hereinbelow. In the following description, the UE may be a UE capable of receiving a downlink signal in a subframe used differently from a subframe of an uplink-downlink configuration indicated by system information, i.e., an eIMTA UE. In addition, the following description may be applied only to an operation of eIMTA, i.e., the case in which transmission is performed in a different direction from a direction of an uplink-downlink configuration indicated by an SIB.

Triggering of CSI Reporting

As a first method, when CSI reporting is triggered, for which subframe set CSI reporting is requested may also be indicated. Specifically, among values of a CSI request field, values for triggering CSI reporting may also indicate specific subframe sets and a (mapping) relationship between the values of the CSI request field and the subframe sets may be indicated by higher layer signaling (after being determined by an eNB/network). For example, among values of a 2-bit CSI request field (the CSI request field may have four states. Therefore, in the case of a 1-bit CSI request field, the 1-bit CSI request field may be increased/expanded to 2 bits or one bit may be added to the 1-bit CSI request field in order to indicate four states), each of values (e.g., 01, 10, and 11) for triggering CSI reporting may indicate a specific subframe set. A value of the CSI request field may indicate only one specific subframe set and, in this case, CSI reporting may be related only to one subframe set among one or more subframe sets configured for a UE. The value of the CSI request field may indicate a subframe set for which CSI reporting is to be performed and simultaneously indicate a CSI process associated with the corresponding subframe set. In other words, the value of the CSI request field may indicate a subframe set and/or a CSI process for which CSI reporting is to be performed. A relationship between the value of the CSI request field and the subframe set and/or the CSI process may be indicated by higher layer signaling/Radio Resource Control (RRC) signaling or may be predetermined. This may also be applied even to a Carrier Aggregation (CA) situation. For example, an eNB may request that the UE report CSI for a specific subframe set of (a specific CSI process) of a specific component carrier through a combination of subframe sets and/or CSI processes.

Alternatively, a field may be added to a downlink signal (DCI formats 0 and 4) transmitting an uplink grant and a subframe set may be indicated by this field. A new field for increasing the number of bits of an existing CQI field or including a more number of bits than the number of bits of the existing CQI field may be defined. The new field may be useful when eIMTA is applied to a PCell and an SCell, i.e., when an uplink-downlink configuration is reconfigured in the PCell and the SCell. For example, the eNB may request that the UE report CSI for a specific subframe set among subframes belonging to a specific CSI process of a specific component carrier. If "N" component carriers are present, "M" CSI processes are configured (it is assumed that CSI processes of the same number are configured in all component carriers), and four subframe sets (according to signal/interference characteristics) are defined, a total of 4×N×M states is needed and a configuration for each state may be signaled to the UE through higher layer signaling. (When the number of bits of an existing CQI request field is maintained, a valid combination selected by the eNB may be signaled to the UE through higher layer signaling.) The eNB may also request that the UE report CSI for a specific subframe set in a specific CSI process of a specific component carrier through a combination of information of the existing CQI request field and additional information of a new field. For example, a specific component carrier and a specific CSI process may be configured by the existing CQI field and information about a specific subframe set in the corresponding CSI process may be indicated through an additional field. That is, subframe set information generated by eIMTA may be additionally signaled.

It may be appreciated that, in the above-described first method, a subframe set associated with CSI reporting is determined by information related to/transmitted along with an uplink grant regardless of to which subframe set a subframe transmitting the uplink grant belongs.

As a second method, a subframe to which CSI reporting is related may be determined according to a subframe in which an uplink grant for activating a CSI request is received. For example, if a subframe in which the uplink grant is received is included in a static subframe set, CSI reporting may be performed with respect to a static subframe set. As mentioned above, since the uplink grant is not transmitted in a flexible subframe in eIMTA, it may be appreciated that, in the second method, CSI reporting for a specific subframe set (e.g., flexible subframe set) is not performed.

In a third method, CSI for all subframe sets may be simultaneously reported.

In a fourth method, a subframe set that should be subframe-specifically reported may be determined More specifically, any specific indication (this may be referred to as an A-CSI indication (SF) set or a CSI reporting set) may be indicated through higher layer signaling. According to this indication, CSI for a subframe set allocated to a subframe in which an uplink grant is transmitted (or a subframe for which CSI reporting is performed) may be reported. For example, if the A-CSI indication set is 0, 0, 0, 0, 1, 1, 1, 1, 1, 1 in a radio frame, wherein 0 indicates a flexible subframe set and 1 indicates a static subframe set, and an uplink grant is transmitted in subframes #3 and #4, CSI triggering by subframe #3 may be related to a flexible subframe set and CSI triggering by subframe #4 may be related to a static subframe set. If this scheme is applied to CA and/or Coordinated Multi-Point (CoMP) transmission, a subframe type for which CSI is to be reported in each CSI process of each carrier component (and/or transmission point) may be pre-allocated to each downlink subframe and CSI allocated to a downlink subframe in which an uplink grant for activating a CSI request is received may be reported.

Determination of CSI Reference Resource

When triggering of CSI reporting described above is used, a CSI reference resource may be determined as follows.

The CSI reference resource may be a last subframe not later than a subframe (subframe n-k) which precedes subframe n, for which CSI is reported, by k subframes (where k may be 4) (i.e., may be a valid subframe among subframes prior to subframe n-k). The last subframe may be a subframe included in a subframe set related to CSI reporting (i.e., a triggered subframe set). The subframe set related to CSI reporting may be determined by one of the methods described above in "Triggering of CSI reporting". For example, if the subframe set related to CSI reporting is determined by a value of a CSI request field, the above last subframe may be a subframe included in a subframe set determined by the value of the CSI request field.

In other words, the CSI reference resource may be a subframe that satisfies a condition that the subframe is included in a subframe set related to CSI reporting and a condition that the subframe is nearest to a subframe for which CSI reporting is performed among subframes which precede the subframe for which CSI reporting is performed by k subframes. The CSI reference resource may be applied to a UE for which a single CSI process of transmission modes 1 to 9 or transmission mode 10 is configured. The single CSI process may be comprised of one CSI-RS resource and one CSI Interference Measurement (CSI-IM) resource or one CSI-RS resource and two CSI-IM resources as described later.

The CSI reference resource may also be applied to a plurality of CSI processes. For example, if two or more CSI processes are configured, the CSI reference resource may be a valid subframe among previous subframes including subframe n−4 when two CSI processes are configured and may be a valid subframe among previous subframes including subframe n−5 when three or more CSI processes are configured.

In the above scheme, to which subframe set a subframe in which an uplink grant is transmitted belongs may not greatly affect determination of the CSI reference resource. Unlike this, the CSI reference resource may be determined according to which subframe set a subframe in which an uplink grant is transmitted belongs.

For example, if a subframe set to which a subframe in which an uplink grant is transmitted belongs is different from a subframe set requested by the uplink grant (e.g., a subframe set determined by a value of a CSI request field), the CSI reference resource may be a subframe which belongs to the same subframe set as a subframe set designated by the uplink grant and is nearest to the subframe set in time among subframes prior to subframe (n-k). If a subframe in which the uplink grant is transmitted is the same as a subframe set requested by the uplink grant, the CSI reference resource may be determined to be the subframe in which the uplink grant is transmitted.

Meanwhile, if a valid downlink subframe among downlink subframes belonging to a subframe set indicated by the uplink grant is located prior to a predetermined time from a subframe in which the uplink grant is transmitted (e.g., the predetermined time may be predefined as 5 subframes, etc. or may be indicated by higher layer signaling), CSI reporting may be omitted. This is because there is a difficulty in reflecting an actual channel state when a considerable time elapses from the subframe in which the uplink grant is transmitted.

In the above description, the "subframe in which the uplink grant is transmitted" may be replaced with an "uplink subframe in which a response to the uplink grant is transmitted". That is, in the above description, a reference time for determining the CSI reference resource is the subframe in which the uplink grant is transmitted and this reference time may be replaced with an uplink subframe in which a response to the uplink grant is transmitted.

Interference Measurement Subset and CSI Process

Hereinabove, (interference) measurement for two or more subframe sets has been described. Measurement performed in units of subframe sets may be distinguished by CSI-IM subsets.

Figure 8:
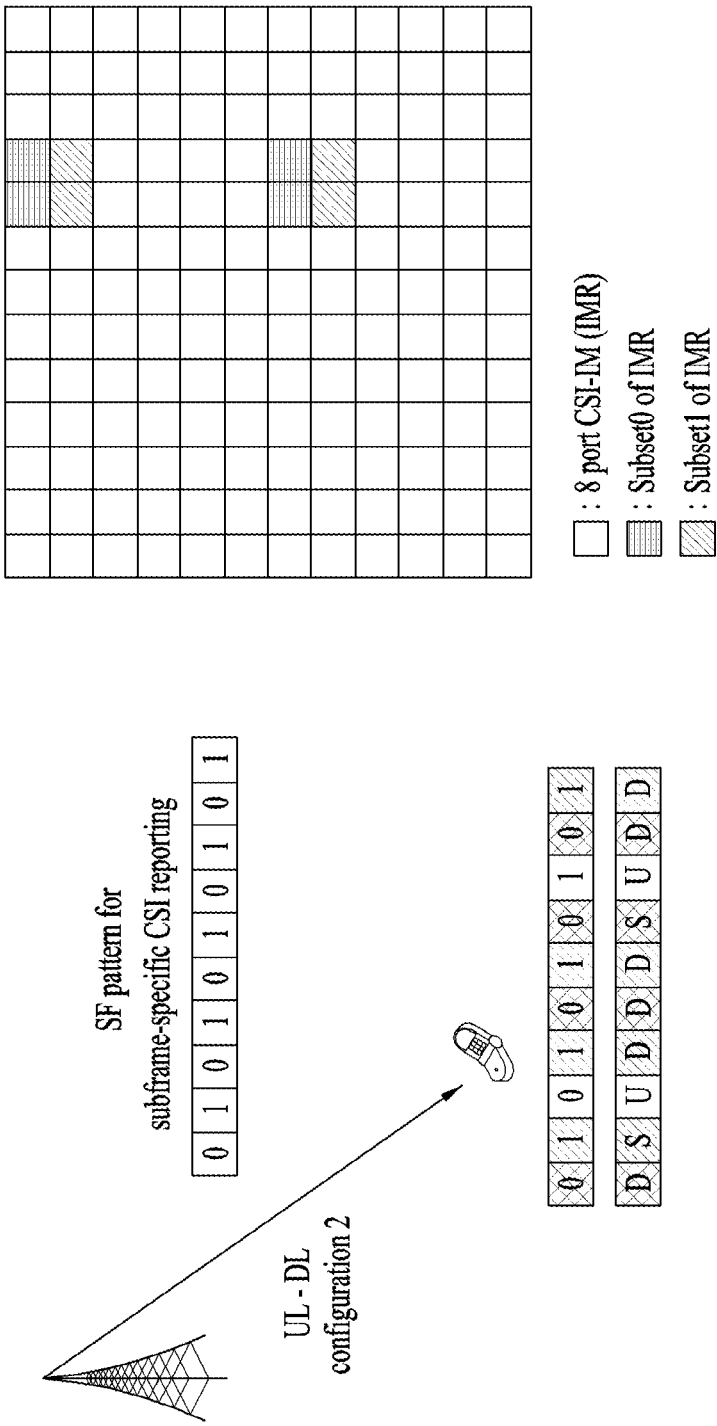
FIGS. 8 and 9 are diagrams for explaining an embodiment of the present invention.

For example, an eNB may designate a multiport (e.g., 2-, 4-, or 8-port) CSI-RS configuration as CSI-IM and configure CSI-IM by two CSI-IM subsets, and a neighboring eNB may transmit signals corresponding to downlink transmission and uplink transmission in the two CSI-IM subsets. This may correspond to the case in which one CSI-RS process is comprised of one CSI-RS configuration and one CSI-IM configuration. In this case, one CSI-IM configuration may include a plurality of CSI-IM subsets. FIG. 8 illustrates an example of using the subsets. Referring to FIG. 8, an eNB may inform a UE of a CSI process in 8-port CSI-IM is included and two subsets (subset 0 and subset 1) included in the CSI-IM and may inform the UE of information (a subframe pattern for subframe-specific CSI reporting) regarding which CSI-IM subset is to be used when aperiodic CSI reporting is triggered. The UE may select a CSI process to be reported by an uplink grant and determine a CSI-IM subset for which measurement is to be actually reported in the CSI process by a subframe index in which the uplink grant is transmitted. That is, in FIG. 8, upon receiving the uplink grant in subframe #0, the UE may measure interference in CSI-IM subset 0 and upon receiving the uplink grant in subframe #3, the UE may measure interference in CSI-IM subset 1.

The CSI process may be comprised of one CSI-RS configuration and two CSI-IM resources/configurations. (One CSI-IM configuration is divided into a plurality of subsets in the previous case, whereas two different CSI-IM resources/configurations are configured in this case.) Then, each CSI-IM configuration may serve as a subframe set in the previous description and a subframe set index and an Interference Measurement Resource (IMR) configuration index may be interlocked. For example, in the previous description, if a subframe set related to CSI reporting is indicated by a CSI request field, interference is measured using an IMR configuration associated/interlocked with the subframe set. (An association relationship between the subframe set and the IMR configuration may be predefined or may be indicated by higher layer signaling.)

Figure 9:
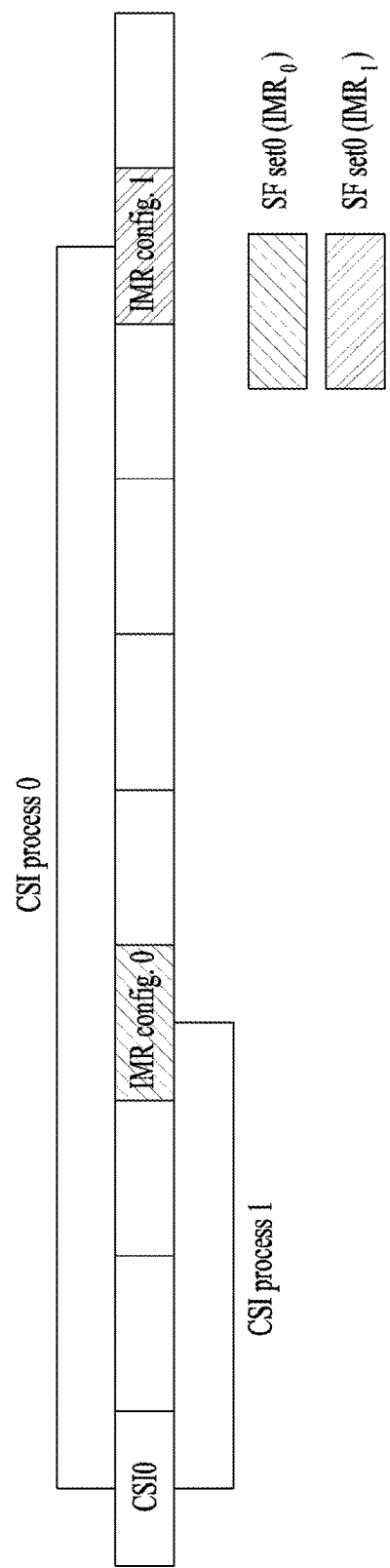

As illustrated in FIG. 9, a combination of one CSI-RS configuration and two CSI-IM configurations may constitute two CSI processes. Alternatively, a combination of two CSI-RS configurations and two CSI-IM configurations may constitute two CSI processes. The eNB may request that the UE report CSI for different signals/interference environments by configuring a CSI process corresponding to the subframe set in the above description. The eNB may set up CSI-RS configurations 1 and 2 using CSI-RSs located in a static subframe and a dynamic subframe and set up a CSI-IM configuration in each of a flexible downlink subframe, a flexible uplink subframe, a static downlink subframe, and a static uplink subframe of a main interference cell. The eNB may configure a plurality of CSI-RS processes through a combination of CSI-RS configurations and CSI-IM configurations and request that UE report CSI for a specific CSI process.

Operation when restricted measurement by eIMTA and restricted measurement by eICIC are mixed.

In addition to the above-described subframe set related to eIMTA, there may be many subframe sets related to reporting such as a subframe set related to enhanced Inter-Cell Interference Coordination (eICIC). In this case, priority of subframe sets for which CSI should be reported may be designated with respect to each CSI process (or commonly with respect to all CSI processes) or it may be predefined (semi-statically by higher layer signaling) that CSI for a specific CSI process and/or a specific subframe set is reported. In this case, an uplink grant may designate a CSI process for which CSI is to be reported and a subframe set (or CSI-IM corresponding to the subframe set) for which CSI is to be reported may be designated by a subframe in which the uplink grant is transmitted. For example, it may be predefined that in aperiodic CSI reporting, CSI for a specific subframe set (e.g., only a static subframe set) may be reported and, in periodic CSI reporting, another subframe set (e.g., a flexible subframe set) may be reported. Alternatively, CSI processes may be designated such that CSI for all subframe sets of a specific CSI process is reported. (In this case, the subframe set may be designated according to each CSI process set (indicated by higher layer signaling) or may be commonly applied to all CSI process sets. Alternatively, priority for subframe sets may be determined according to each CSI process by the eNB.) As another method for signaling a subframe set or a CSI process, corresponding content may be included in an uplink-downlink reconfiguration message. For example, CSI for a flexible subframe set may be designated to be reported in aperiodic CSI reporting through the reconfiguration message, so that CSI for a static subframe set is reported in periodic CSI reporting and CSI for a flexible subframe set is reported in aperiodic CSI reporting.

As another method, the number of CSI processes designated for CSI reporting may be adjusted. In TDD, for multiple CSI reporting, the number of CSI reported at a time and a location of a reference resource may be changed according to the number of CSI processes that should be reported. In an eIMTA environment, if a plurality of subframe sets (e.g., a static subframe set and a flexible subframe set) is designated per CSI process, the number of CSI processes may be applied based on the number of subframe sets. For example, an existing reference (i.e., the number of CSI processes) may be applied by assuming/regarding subframe sets per CSI process as respective CSI processes. That is, if two CSI processes are allocated to a specific CSI process set and each CSI process is divided into two subframe sets, the UE may assume that four CSI processes are allocated to the corresponding CSI process set. (In this case, priority for the subframe sets may be assigned. For instance, a subframe set belonging to a low CSI process index may be reported first or indexing for the subframe sets may be performed to perform reporting starting from a low index.) If each subframe set is regarded as a CSI process, CSI reporting for some CSI processes (or subframe sets) may be restricted due to UE capabilities for the number of CSI processes that can be simultaneously reported.

If subframe sets in a CSI process configured by the eNB are respectively regarded as CSI processes, reporting may be performed starting from a CSI process of a low index based on a new CSI process index. The new CSI process index may be configured by the eNB (through higher layers signaling) or may be predefined. (The new CSI process index may be used only to indicate reported priority.) As an example, (if a maximum of two subframe sets is defined per CSI process) indexing for subframe set 0 of each CSI process is performed first and indexing for subframe set 1 may be performed. That is, if two CSI processes (CSI process 0 and CSI process 1) (in the same CSI process set) are defined and each CSI process includes two subframe sets (subframe set 0 and subframe 1), the new CSI process index may be defined such that index idx0=subframe set 0 of CSI process 0, idx1=subframe set 0 of CSI process 1, idx2=subframe set 1 of CSI process 0, and idx3=subframe set 1 of CSI process 1 and reporting may be performed starting from as a low index as the number of CSI that can be reported by each UE. In this case, CSI that has not been reported due to a high index in previous reporting may be reported first and, if a reporting time and a measurement time differ by more than a predetermined time (e.g., a new reconfiguration time), corresponding CSI reporting may be omitted. The predetermined time may be signaled by the eNB or may be predefined. The eNB may signal to the UE to omit specific CSI reporting irrespective of the predetermined time.

As another method, CSI for all subframe sets included in a CSI process belonging to each CSI process set may be simultaneously reported. (In this case, the number of CSI for a current timing at which actual reporting is performed may be limited by the number of CSI reporting that was not performed in the past.) To this end, as a condition for obtaining the number of simultaneously reported CSI processes and a location of a reference resource, CSI reporting may be additionally defined with respect to the case in which the number of CSI processes is 5 or more as well as to the case in which the number of CSI processes is two or three (in this process, the number of CSI processes may be counted in a subframe set level included in a CSI process) and a value k for acquiring the reference resource may also be additionally designated according to the numbers of CSI processes and subframe sets.

Others Related to CSI Reporting

In the above description, if a subframe set for measurement is transmitted by higher layer signaling, an operation in an ambiguity interval may be problematic. In addition, even when an uplink-downlink configuration is changed by a reconfiguration message, the ambiguity interval may occur. Then, a subframe set that should be reported may be determined according to a type of a search space in which an uplink grant is transmitted as a fallback mode operation. In this case, a subframe set for which reporting is performed may be predetermined or may be indicated by higher layer signaling. For example, if the uplink grant is transmitted through a common search space, CSI reporting for a first subframe set may be performed and, if the uplink grant is transmitted through a UE specific search space, CSI reporting for a second subframe set may be performed.

Meanwhile, in the above-described method in which one subframe set is regarded as one CSI process, the number of CSI processes applied to periodic CSI reporting may differ from the number of CSI processes applied to aperiodic CSI reporting. For example, if four CSI processes are present and each CSI process includes two subframe sets, this may be regarded as 8 CSI processes. Here, it may be assumed that all 8 CSI processes are available in periodic reporting and only four CSI processes having low indexes are available in aperiodic reporting. The available CSI processes in periodic reporting may be predefined (i.e., a predetermined number of CSI processes determined in order of a low index is determined to be available as in the above example) or may be designated by the eNB through higher layer signaling (e.g., a specific subframe set of a specific CSI process may be designated or a part of newly indexed CSI processes may be designated). If reindexing is needed, indexing for new CSI processes may be predefined (e.g., indexed in ascending order starting from a subframe set belong to a CSI process of a low index) or may be indicated by the eNB to the UE through higher layer signaling.

The eNB may evenly distribute timings of periodic CSI reporting so that CSI for all newly indexed CSI processes may be reported. The eNB may indicate each UE to perform aperiodic CSI reporting by reporting some or all newly defined CSI processes (i.e., a subframe set of eIMTA is defined as a CSI process) using the above-described method(s).

In the above description, two subframe sets (a flexible subframe set and a static subframe set) have been exemplarily configured for the UE in relation to eIMTA. The present invention is not limited thereto and subframe sets considering various interference situations may be configured. For example, subframes used in a serving cell and a neighboring cell may be divided into a static uplink subframe (SU), a static downlink subframe (SD), a flexible uplink subframe (FU), and a flexible downlink subframe (FD). Therefore, 8 subframe sets may be configured as shown in Table 5 below.

TABLE 5

|  | Subframe set 0 | Subframe set 1 | Subframe set 2 | Subframe set 3 | Subframe set 4 | Subframe set 5 | Subframe set 6 | Subframe set 7 |
| --- | --- | --- | --- | --- | --- | --- | --- | --- |
| Serving cell | SD | SD | SD | SD | FD | FD | FD | FD |
| Neighboring cell | SD | FD | SU | FU | SD | FD | SU | FU |

The above description may be applied to CA. That is, in a CA situation, if different uplink-downlink configurations are used in a PCell and an SCell (additionally, if PCell and SCell have different static/flexible subframe configurations through different uplink-downlink reconfigurations), the above proposal may be used even for a CSI request for a specific (static/flexible) subframe set of each cell.

For example, in the case of cross carrier scheduling, the eNB may request that the UE measure and report CSI for a specific subframe set (e.g., a subframe set including a static downlink subframe) of a specific component carrier. To this end, the eNB may inform the UE of subframe set information of each component carrier through higher layer signaling.

Configuration of Device According to Embodiment of the Present Invention

Figure 10:
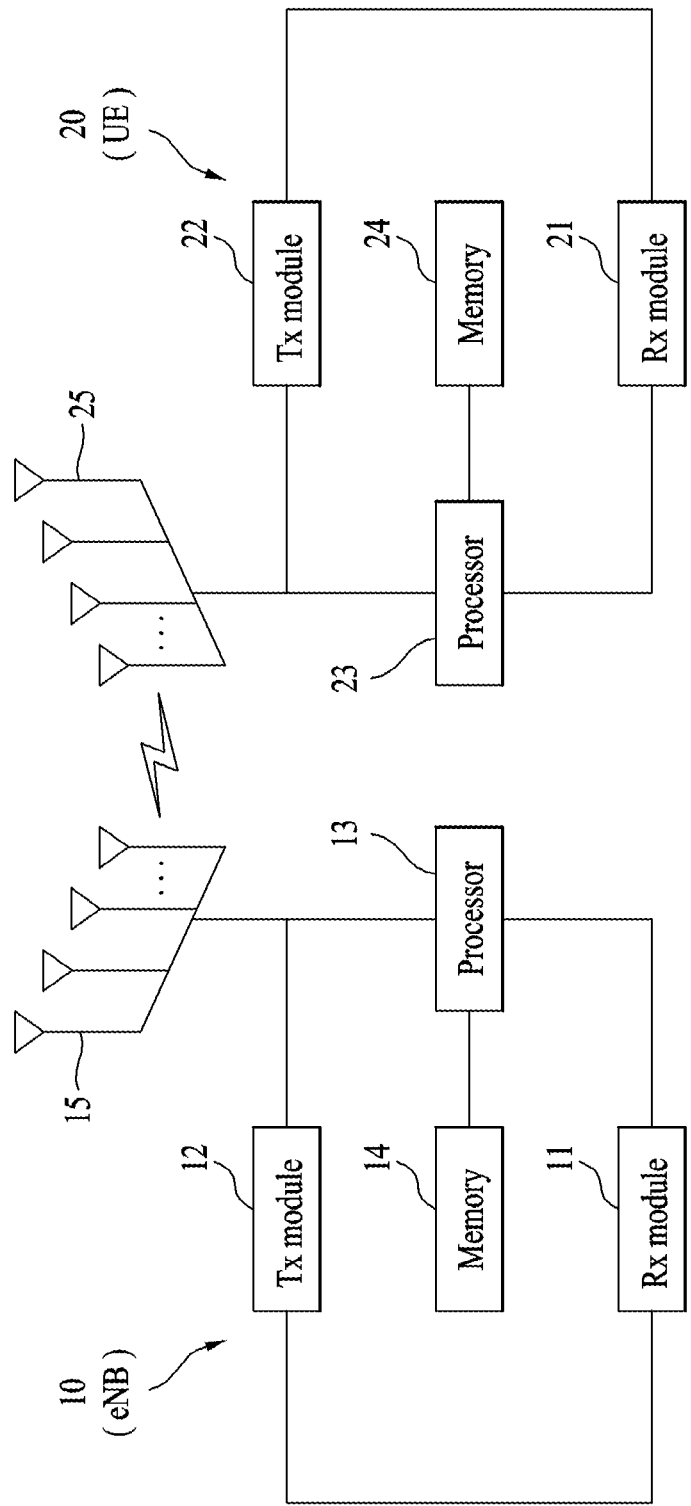
FIG. 10 is a diagram illustrating the construction of a transmission apparatus and a reception apparatus.

FIG. 10 is a diagram illustrating the construction of a transmission point apparatus and a UE apparatus according to an embodiment of the present invention.

Referring to FIG. 10, a transmission point apparatus 10 according to the present invention may include a reception (Rx) module 11, a transmission (Tx) module 12, a processor 13, a memory 14, and a plurality of antennas 15. The plurality of antennas 15 indicates a transmission point apparatus for supporting MIMO transmission and reception. The Rx module 11 may receive a variety of signals, data, and information on UL from the UE. The Tx module 12 may transmit a variety of signals, data, and information on DL to the UE. The processor 13 may control overall operation of the transmission point apparatus 10.

The processor 13 of the transmission point apparatus 10 according to one embodiment of the present invention may operate to perform the above-mentioned embodiments.

The processor 13 of the transmission point apparatus 10 processes information received at the transmission point apparatus 10 and transmission information to be externally transmitted. The memory 14 may store the processed information for a predetermined time. The memory 14 may be replaced with a component such as a buffer (not shown).

Referring to FIG. 10, a UE apparatus 20 may include an Rx module 21, a Tx module 22, a processor 23, a memory 24, and a plurality of antennas 25. The plurality of antennas 25 indicates a UE apparatus supporting MIMO transmission and reception. The Rx module 21 may receive downlink signals, data, and information from the eNB. The Tx module 22 may transmit UL signals, data, and information to the eNB. The processor 23 may control overall operation of the UE apparatus 20.

The processor 23 of the UE apparatus 20 according to one embodiment of the present invention can operate to perform the above-mentioned embodiments.

The processor 23 of the UE apparatus 20 processes information received at the UE apparatus 20 and transmission information to be externally transmitted. The memory 24 may store the processed information for a predetermined time. The memory 24 may be replaced with a component such as a buffer (not shown).

The specific configurations of the transmission point apparatus and the UE apparatus may be implemented such that the various embodiments of the present invention are independently performed or two or more embodiments of the present invention are simultaneously performed. Redundant matters will not be described herein for clarity.

The description of the transmission point apparatus 10 shown in FIG. 10 may be identically applied to a relay node acting as a DL transmission entity or UL reception entity and the description of the UE apparatus 20 may be identically applied to the relay node acting as a DL reception entity or a UL transmission entity.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the exemplary embodiments of the present invention is given to enable those skilled in the art to realize and implement the present invention. While the present invention has been described referring to the exemplary embodiments of the present invention, those skilled in the art will appreciate that many modifications and changes can be made to the present invention without departing from the scope of the present invention. For example, the constructions of the above-described embodiments of the present invention may be used in combination. Therefore, the present invention is not intended to be limited to the embodiments disclosed herein but is to give a broadest range matching the principles and new features disclosed herein.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention. The present invention is not intended to limit the embodiments disclosed herein but is to give a broadest range matching the principles and new features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The above-described embodiments of the present invention are applicable to various mobile communication systems.

What is claimed is:

1. A method for performing Channel State Information (CSI) reporting by a User Equipment (UE) in a wireless communication system, the method comprising:
receiving a first uplink-downlink (UL-DL) configuration indicating whether each of a plurality of subframes is configured as a UL subframe or a DL subframe;
receiving a second UL-DL configuration to reconfigure a UL subframe indicated by the first UL-DL configuration to a DL subframe indicated by the second UL-DL configuration;
receiving, by the UE, a downlink signal including a Downlink Control Information (DCI) format including a CSI request field;
determining, by the UE, a Channel Quality Indicator (CQI) value based on a Physical Downlink Shared Channel (PDSCH) transport block in a CSI reference resource when the CSI request field triggers CSI reporting; and
performing, by the UE, CSI reporting including the CQI value in a subframe n, where n is an arbitrary identifier,
wherein the CSI reference resource is a last valid subframe among subframes which precede the subframe n by four subframes,
wherein the CSI reference resource is a DL subframe indicated by the first UL-DL configuration, and
wherein the DL subframe indicated by the first UL-DL configuration and that is the CSI reference resource is not reconfigured by the second UL-DL configuration.

2. The method according to claim 1, wherein, if two or more subframe sets are configured for the UE, a subframe set related to CSI reporting is indicated by a CSI request field included in the downlink signal.

3. The method according to claim 2, wherein the last subframe is included in the subframe set related to CSI reporting.

4. The method according to claim 3, wherein at least one CSI process is configured for the UE.

5. The method according to claim 4, wherein the CSI process includes a CSI-Reference Signal (CSI-RS) resource for signal measurement and two CSI-Interference Measurement (IM) resources for interference measurement.

6. The method according to claim 2, wherein the CSI reference resource corresponds to a subframe set indicated by the CSI request field.

7. The method according to claim 1, wherein the UE has capabilities of receiving a downlink signal in a subframe different from a subframe used in an uplink-downlink configuration indicated by system information.

8. The method according to claim 2, wherein a relationship between a value of the CSI request field and the two or more subframe sets is indicated by a Radio Resource Control (RRC) signaling.

9. The method according to claim 1, wherein a transmission mode configured for the UE is one of transmission modes 1 to 10.

10. The method according to claim 1, wherein the DCI includes the uplink grant.

11. The method according to claim 1, wherein CSI reporting is transmitted over a Physical Uplink Shared Channel (PUSCH).

12. A User Equipment (UE) for which a plurality of Channel State Information (CSI)-Reference Signal (RS) configurations is configured in a wireless communication system, the UE comprising:
   a reception module; and
   a processor,
   wherein the processor is configured to
     receive a first uplink-downlink (UL-DL) configuration indicating whether each of a plurality of subframes is configured as a UL subframe or a DL subframe,
     receive a second UL-DL configuration to reconfigure a UL subframe indicated by the first UL-DL configuration to a DL subframe indicated by the second UL-DL configuration,
     receive a downlink signal including a Downlink Control Information (DCI) format including a CSI request field,
     determine a Channel Quality Indicator (CQI) value based on a Physical Downlink Shared Channel (PDSCH) transport block in a CSI reference resource when the CSI request field triggers CSI reporting, and
     perform CSI reporting including the CQI value in a subframe n, where n is an arbitrary identifier,
   wherein the CSI reference resource is a last valid subframe among subframes which precede the subframe n by four subframes,
   wherein the CSI reference resource is a DL subframe indicated by the first UL-DL configuration, and
   wherein the DL subframe indicated by the first UL-DL configuration and that is the CSI reference resource is not reconfigured by the second UL-DL configuration.

* * * * *